(12) United States Patent
Vajo et al.

(10) Patent No.: US 9,822,006 B2
(45) Date of Patent: Nov. 21, 2017

(54) METHOD TO FORM FE16N2

(71) Applicant: The Boeing Company, Chicago, IL (US)

(72) Inventors: John J. Vajo, West Hills, CA (US); Adam Franklin Gross, Santa Monica, CA (US); Shanying Cui, Calabasas, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/682,245

(22) Filed: Apr. 9, 2015

(65) Prior Publication Data

US 2016/0297679 A1 Oct. 13, 2016

(51) Int. Cl.
*C01B 21/06* (2006.01)
*B01J 3/02* (2006.01)
*B01J 3/04* (2006.01)

(52) U.S. Cl.
CPC ............. *C01B 21/0622* (2013.01); *B01J 3/02* (2013.01); *B01J 3/04* (2013.01); *C01P 2004/16* (2013.01); *C01P 2004/32* (2013.01); *C01P 2004/54* (2013.01); *C01P 2004/64* (2013.01)

(58) Field of Classification Search
None
See application file for complete search history.

(56) References Cited

U.S. PATENT DOCUMENTS

| 2005/0123754 A1* | 6/2005 | Masada | B82Y 30/00 428/402 |
| 2009/0252991 A1* | 10/2009 | Ishikawa | B82Y 30/00 428/800 |
| 2012/0328883 A1* | 12/2012 | Hashimoto | C01B 21/0615 428/404 |

OTHER PUBLICATIONS

K.H. Jack, "The synthesis and characterization of bulk α"-Fe16N2", Journal of Alloys and Compounds 222, 1995, pp. 160-166.
(Continued)

*Primary Examiner* — Guinever S Gregorio
(74) *Attorney, Agent, or Firm* — MH2 Technology Law Group LLP

(57) ABSTRACT

Provided is a method and system for making powdered $Fe_{16}N_2$. The method can include sealing iron powder and a fixed amount of ammonia ($NH_3$) gas within a pressure vessel. The pressure of the fixed amount of ammonia gas in the pressure vessel can be elevated so that $Fe_{16}N_2$ can be formed from the iron powder. Use of a pressure vessel and a fixed amount of ammonia gas can provide economic and environmental benefits such as higher conversion rates of iron powder into $Fe_{16}N_2$, reduced ammonia gas use, and reclamation of used ammonia gas.

15 Claims, 2 Drawing Sheets

(56) References Cited

OTHER PUBLICATIONS

S. Kikkawa et al., "Fine Fe16N2 powder prepared by low-temperature nitridation", Materials Research Bulletin 43, 2008, pp. 3352-3357.

H. Shinno et al., "Synthesis of α"-Fe16N2 iron nitride by means of nitrogen-ion implantation into iron thin films", Journal of Materials Science 32, 1997, pp. 2255-2261.

Marc Widenmeyer et al., "Formation and Decomposition of Metastable α"-Fe16N2 from in situ Powder Neutron Diffraction and Thermal Analysis", Z. Anorg. Allg. Chem. 639, (15), 2013, pp. 2851-2859.

Kohetsu Yamanaka et al., "Humidity effects in Fe16N2 fine powder preparation by low-temperature nitridation", Journal of Solid State Chemistry 183, 2010, pp. 2236-2241.

\* cited by examiner

180
METHOD TO FORM FE16N2

FIELD

The present disclosure generally relates to methods of forming iron nitride and, more particularly, to methods of forming $Fe_{16}N_2$ in a pressure vessel.

BACKGROUND

Since its discovery in 1999, three methods have been used to make $Fe_{16}N_2$. In a first method, flowing ammonia gas ($NH_3$) over iron powder in a furnace converts the iron powder into $Fe_{16}N$. Furnace conditions include temperatures between 120-210° C. for 3 to 200 hours at atmospheric pressure. This method, however, releases significant amounts of ammonia gas into the environment.

In a second method to make $Fe_{16}N_2$, a furnace heats iron powder in a flowing gas mixture of $H_2$ and $NH_3$ to form iron or an iron nitride. Continued heating to temperatures above 600° C. transforms the material into γ iron nitride. Quenching of the γ iron nitride in an ice bath or liquid nitrogen forms α' iron nitride. Heating of the α' iron nitride to temperatures below 200° C. forms $Fe_{16}N_2$. Both of the methods described above release ammonia gas into the atmosphere. Furthermore, both methods suffer from low penetration of the ammonia gas into the iron powder. This wastes a significant portion of the ammonia gas and results in low amounts of iron powder transforming into $Fe_{16}N_2$. Methods to reclaim the flowing ammonia gas are known, but require additional cost and equipment such as cooling/condensation chambers attached to the furnace.

In a third method, sputtering or ion implantation forms a thin film of $Fe_{16}N_2$. In addition to suffering from low throughput, it produces a thin film that is difficult to process into coatings or desired shapes.

These conventional methods suffer from an inability to efficiently produce bulk amounts of $Fe_{16}N_2$ and can require costly additional steps to reduce the environmental impact of using flowing ammonia gas. Thus, a need exists in the industry to address the aforementioned deficiencies and inadequacies.

SUMMARY

According to the present teachings, a method for producing powdered $Fe_{16}N_2$ is provided. The method includes providing a powdered material comprising iron. The powdered material comprising iron and an amount of ammonia ($NH_3$) gas are sealed within a pressure vessel. Then the pressure of the amount of $NH_3$ gas in the pressure vessel can be elevated to about 30 psi to about 5000 psi. Under these conditions, at least one type of iron nitride is formed from the powdered material comprising iron. The formed iron nitrides are then collected in an inert gas environment, wherein $Fe_{16}N_2$ is one type of iron nitride that is formed.

According to the present teachings, a system for producing powdered $Fe_{16}N_2$ is also provided. The system for producing $Fe_{16}N_2$ can include a pressure vessel configured to seal an amount of powdered material comprising iron and an amount of $NH_3$ gas within the pressure vessel and a valve connected to one or more lengths of tubing. The system can further include a source of $NH_3$ connected to the pressure vessel by the one or more lengths of tubing, wherein the valve controls a flow of $NH_3$ gas into the pressure vessel. The system can also include a heating system to elevate a pressure of the amount of $NH_3$ gas in the pressure vessel to about 30 to about 5000 psi to convert at least 56% or more of the amount of powdered material comprising iron into $Fe_{16}N_2$.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate the present disclosure and together with the description, serve to explain the principles of the present disclosure.

DESCRIPTION

Reference will now be made in detail to exemplary implementations of the present disclosure, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary implementations in which the present disclosure may be practiced. These implementations are described in sufficient detail to enable those skilled in the art to practice the present disclosure and it is to be understood that other implementations may be utilized and that changes may be made without departing from the scope of the present disclosure. The following description is, therefore, merely exemplary.

Implementations of the present disclosure address the need for a method and system to produce bulk amounts powdered $Fe_{16}N_2$ without the environmental concerns associated with the use of flowing ammonia ($NH_3$) gas. The disclosed method and system use a pressure vessel to create a sealed environment with an elevated $NH_3$ pressure. This allows enhanced interaction between the powdered iron and the ammonia gas resulting in higher conversion of iron into $Fe_{16}N_2$. The use of the sealed pressure vessel also dramatically reduces the amount of ammonia used providing environmental and economic benefits. In addition to using a fixed amount of ammonia gas, the disclosed implementations allow the used ammonia gas to be more easily reclaimed and reused.

Figure 1:
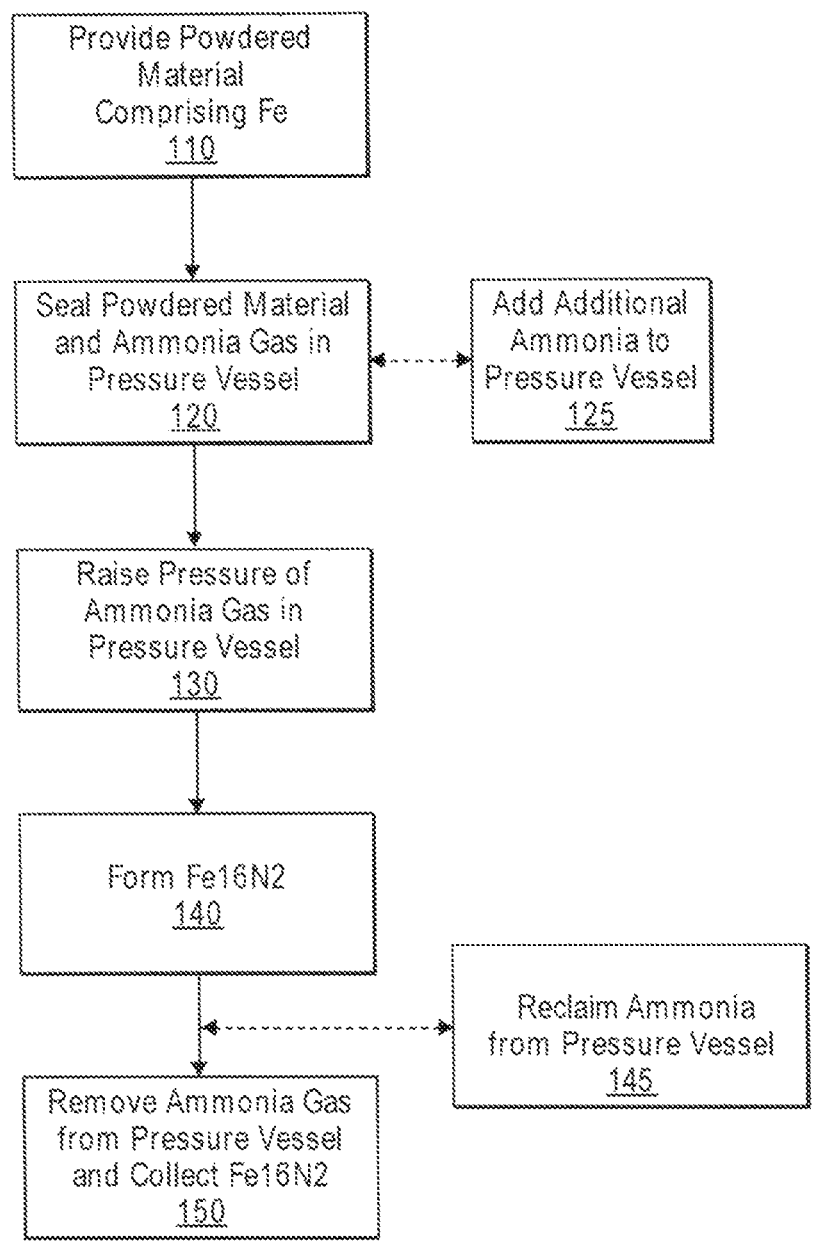
FIG. 1 depicts an exemplary process flow for producing $Fe_{16}N_2$.

FIG. 1 shows a process flow 100 for a method to make powdered $Fe_{16}N_2$. In 110, a powdered material comprising iron (Fe) is provided. The powdered material comprising iron can be, for example, Fe powder. The powdered material comprising iron can take a form of spheres, spheroids, rods, wires, cubes, sheets, platelets, or hexagonal prisms. Particles of the powdered material comprising iron can be uniform, irregular, or a combination thereof. The powdered material comprising iron can have at least one dimension from about 5 nm to about 100 microns. The powdered material comprising iron can have a ratio between a largest dimension and a smallest dimension of about 200:1 to about 1:1. The ratio between the largest dimension and the smallest dimension can further be about 100:1 to about 5:1.

The powdered material comprising iron can further be doped with one or more other materials, including but not limited to manganese (Mn), cobalt (Co), and nickel (Ni). For example, these materials can be applied as a metal oxide coating on an iron oxide and become dopants when the metal oxide and iron oxide are reduced. The metal oxide coatings can include, but are not limited to, aluminum oxide silicon dioxide, titanium dioxide, zirconium oxide, or a rare earth oxide. During reduction of iron oxide to iron, the metal oxide coatings can act like a cast that does not change shape and further permits the underlying powdered material comprising iron to maintain its shape. Dopants can tailor the properties of the $Fe_{16}N_2$, for example, they can be used to lower coercivity. The below two examples show methods to make exemplary doped and/or coated iron powders for use as starting materials to make $Fe_{16}N_2$.

EXAMPLE 1

Conversion of FeOOH Nanowires into Iron Nanowires

Example 1 provides a method of making a powdered material comprising iron coated with alumina.

FeOOH nanowires having dimensions of 50 nm×5000 nm were obtained from Novarials, Inc. (Woburn, Mass.). For every 133 mg of FeOOH, 63 mg of $Al(NO_3)_3.9H_2O$ was dissolved in 16.6 mL of water and the pH was brought up to 12.5 using 10% NaOH. Subsequently, FeOOH nanowires were dispersed into the alkaline solution while constantly stirring. Carbon dioxide gas was blown into the resulting slurry to obtain a pH of 8, depositing a layer of aluminum hydroxide onto the nanowires. The slurry with the nanowires was centrifuged to collect solids which were then suspended in water, decanted and redispersed in water three times. The resulting solid material was heated at 400° C. for 3 hours in air to allow for drying and dehydroxylation. To reduce the FeOOH to a powdered material comprising Fe nanowires coated with alumina, the solid material was placed in a tube furnace and heated at 500° C. for 4-24 hours, depending on sample size, under 200 $cm^3$/min 10% $H_2$ in $N_2$ gas. For example, the 100 mg samples of $Al_2O_3$ coated FeOOH required 4 hours for reduction and 2 g samples required 24 hours. A resulting XRD pattern confirmed production of a (alpha) Fe nanowires coated with alumina.

EXAMPLE 2

Formation of Mn Doped Iron Nanowires

Example 2 provides a method of making a powdered material comprising iron doped with Mn.

Mn was coated on the FeOOH nanowires (Novarials, Inc., Woburn, Mass.) by first making a 2.2 mM $KMnO_4$ solution (50 mL $H_2O$+175 mg $KMnO_4$), stirring 5 minutes, and adding the FeOOH nanowires at 20 mg/mL solution. The nanowire dispersion was stirred and sonicated. The nanowire dispersion was next placed in a pressure vessel, sealed, and heated at 150° C. for 48 hours. The resulting Mn oxide coated nanowires were then centrifuged and washed. The Mn oxide coated nanowires were then coated with alumina as disclosed above in Example 1.

Figure 2:
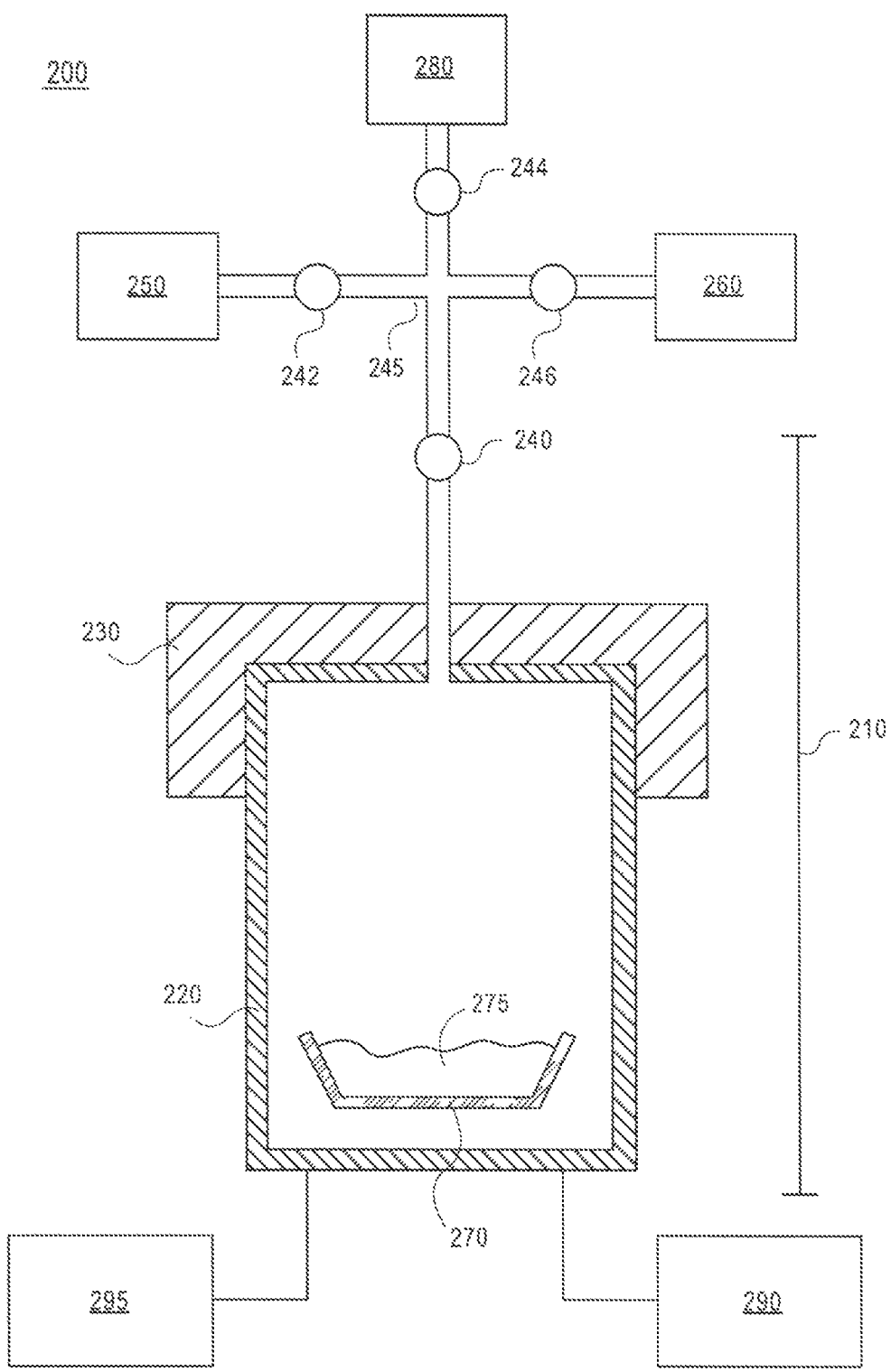
FIG. 2 schematically depicts an exemplary system for producing $Fe_{16}N_2$ including a sectional view of a pressure vessel.

Before returning to the to the exemplary method for making $Fe_{16}N_2$ shown in FIG. 1, an exemplary system will be described for forming $Fe_{16}N_2$, as depicted in FIG. 2. System 200 for forming $Fe_{16}N_2$ can include a pressure vessel 210 that comprises a body 220 and a top 230. Top 230 can open to allow insertion of the powdered material comprising iron and be secured to pressure vessel body 220 by, for example, bolts, clamps, etc. Powdered material comprising iron 275 can sit within pressure vessel 210, for example, in an open container 270, such as a glass dish. Once secured, pressure vessel body 220 and top 230 can seal pressure vessel 210 sufficiently to maintain a vacuum and $NH_3$ gas at an elevated pressure. A plurality of valves 240, 242, 244, 246 and one or more lengths of tubing 245 can connect pressure vessel 210 to ammonia gas source 250 and a vacuum system 260. As shown, valves 242, 240 control flow between ammonia gas source 250 and pressure vessel 210. Valves 246, 240 control flow between vacuum system 260 and pressure vessel 210. Valves and tubing can also connect pressure vessel 210 to a separate chamber 280. Valves 244, 240 control flow between separate chamber 280 and pressure vessel 210. System 200 can further include a cooling system 290 and heating system 295 to respectively lower and raise a temperature of pressure vessel 210. Cooling system can be, for example, an ice or liquid nitrogen bath. Heating system 295 can be, for example, an oven that pressure vessel 210 can be placed into or a heater that can be placed around vessel 210. One of ordinary skill in the art will understand that FIG. 2 is a simplified schematic diagram and that other components can be included, for example, additional valves and tubing to control the vacuum and/or other gas sources, such as for example, an inert gas source and joints to allow removal of the pressure vessel from the ammonia gas source and vacuum system.

Returning to the exemplary method for making $Fe_{16}N_2$ shown in FIG. 1, in 120, the powdered material comprising iron can be placed in a pressure vessel. For example, as shown in FIG. 2, powdered material comprising iron 275 in glass dish 270 can be placed into pressure vessel 210. Top 230 can then be secured to pressure vessel body 220. If desired, sealed pressure vessel 210 can be evacuated using valves 240, 246 and vacuum system 260. Valves 242,240 can be opened to permit a first amount of ammonia gas from source 250 to enter pressure vessel 210. Valves 242,240 can then be closed to reseal pressure vessel 210. For example, the first amount of ammonia gas can be from about 8 to about 200 psi.

As shown at 125, additional ammonia can be inserted into pressure vessel 210. For example, pressure vessel body 220 or a portion of pressure vessel body 220 can be cooled with cooling system 290, for example, an external bath of dry ice or liquid nitrogen, to condense some or all of the first amount of ammonia in pressure vessel 210. Separate chamber 280 can be evacuated, if desired, using valves 244 and 246. Valve 240 can be closed and a second amount of ammonia from source 250 can flow to first fill separate chamber 280 by opening valves 242, 244. Valve 242 can then be closed and valve 240 opened to allow the second amount of ammonia to condense into the cooled vessel body 220. Chamber 280 can be filled multiple times with additional amounts of ammonia gas to provide the desired amount of ammonia in pressure vessel 210. Condensing the ammonia gas in pressure vessel 210 can also be repeated as desired.

At this point, pressure vessel 210 can be sealed so that a closed environment with respect to the amount of ammonia (no flowing gas) exists. The pressure vessel can contain the powdered material comprising iron and the ammonia gas at a pressure of, for example, about 8 to about 200 psi. A molar ratio of Fe to $NH_3$ in the pressure vessel can be from about 1:4 to about 1:2000. The molar ratio of Fe to $NH_3$ in the pressure vessel can further be from about 1:10 to about 1:500 or from about 1:50 to about 1:100.

At 130, the pressure of the ammonia gas in the sealed pressure vessel can be elevated to about 30 psi to about 5000 psi. The pressure of the ammonia gas in the sealed pressure vessel can also be elevated to about 120 psi to about 1500 psi, or from about 200 psi to about 600 psi. For example, the pressure can be elevated in the pressure vessel by heating the pressure vessel to about 130° C. to about 200° C. using heating system 295. Heating can be for a time period of about 8 to about 200 hours. Heating can also be for a time period of about 18 to about 72 hours.

At 140, at least one type of iron nitride can be formed from the powdered material comprising iron. The iron nitride comprises $Fe_{16}N_2$ but can include other form of iron nitride such as $Fe_2N$, $Fe_4N$, and $Fe_3N$. Residual Fe and mixtures can also exist after heating pressure vessel 210.

At 150, ammonia gas can be removed from pressure vessel 210 and the $Fe_{16}N_2$ collected in an inert gas environment. The disclosed method can transform 51% or more of the powdered material comprising iron into $Fe_{16}N_2$. The disclosed method can further transform 56% or more, or 97% or more of the powdered material comprising iron into $Fe_{16}N_2$.

Once the powdered material comprising iron transforms into $Fe_{16}N_2$, the ammonia gas remaining in the pressure vessel can be reclaimed if desired. For example, at 145 the ammonia gas may be reclaimed if desired by transferring it to an evacuated container or condensed with liquid nitrogen into a cooled container. Thus, in addition to enhanced yield compared to conventional methods, the disclosed method uses significantly less ammonia providing environmental and economic benefits. The below examples provide exemplary methods to make $Fe_{16}N_2$ from the iron powders of Examples 1 and 2.

EXAMPLE 3

Conversion of Example 1 Fe Nanowires into $Fe_{16}N_2$ 1.5 g of Example 1 nanowires were sealed in a 300 mL pressure vessel (#4761, Parr Instrument Company, Moline, Ill.) in an argon (Ar) environment. The pressure vessel was then evacuated and charged with 120 psi of 99.99% $NH_3$ through a valve on the pressure vessel. The valve on the pressure vessel was sealed and the pressure vessel was heated for 22 hours at 140° C., cooled, evacuated, and opened in an Ar filled environment. XRD patterns showed the resultant nanowires were a mixture of 51% $Fe_{16}N_2$ and 49% Fe.

EXAMPLE 4

Conversion of Example 2 Mn Doped Fe Nanowires into $Fe_{16}N_2$ 0.1 g of Example 2 nanowires were sealed in the 300 mL pressure vessel in an Ar environment. The pressure vessel was then evacuated and charged with 120 psi 99.99% $NH_3$ through a valve on the pressure vessel. The valve on the pressure vessel was sealed and the pressure vessel was heated for 22 hours at 140° C., cooled, evacuated, and opened in an Ar filled environment. XRD patterns showed the resultant nanowires were a mixture of 56% $Fe_{16}N_2$ and 44% Fe. SEM imaging showed that the $Fe_{16}N_2$ nanowires retained their original nanowire shape after transformation.

EXAMPLE 5

Conversion of Example 1 Fe Nanowires into $Fe_{16}N_2$ 0.5 g of Example 1 nanowires were sealed in the 300 mL pressure vessel in an Ar environment. Then the pressure vessel was evacuated and cooled with liquid nitrogen. A separate chamber of 1000 mL was filled with 120 psi of 99.99% ammonia gas. The valve on the pressure vessel was sealed and the pressure vessel was cooled with liquid nitrogen. The valve to the pressure vessel was opened and the ammonia flowed and condensed from the 1000 mL separate chamber into the cooled pressure vessel. The valve on the pressure vessel was sealed, and the 1000 mL chamber was filled a second time. After condensing a second round of ammonia gas, the valve to the pressure vessel was sealed, and the pressure vessel was warmed to room temperature. The pressure vessel was then heated for 66 hours at 150° C., cooled, evacuated, and opened in an Ar filled environment. Based on the volume of the pressure vessel and vapor pressure of ammonia at room temperature, there was about 1100 psi of ammonia pressure at 150° C. XRD patterns showed the resultant iron oxides were a mixture of 96% $Fe_{16}N_2$ and 4% $Fe_4N$.

EXAMPLE 6

Conversion of Example 2 Mn Doped Iron Nanowires into $Fe_{16}N_2$ 0.1 g of the Mn doped, alumina coated nanowires of Example 2 were sealed in the 300 mL pressure vessel in an Ar environment. Then the pressure vessel was evacuated and charged with 120 psi 99.99% $NH_3$ through the valve on the pressure vessel. The valve on the pressure vessel was sealed and the pressure vessel was heated for 18 hours at 160° C., cooled, evacuated, and opened in an Ar filled environment. XRD patterns showed the resultant iron nitrides were a mixture of 97% $Fe_{16}N_2$ and 3% $Fe_4N$.

The terms and descriptions used herein are set forth by way of illustration only and are not meant as limitations. For example, although methods has been described in top to bottom fashion, the steps of the method may be performed in a different order than illustrated or simultaneously. Furthermore, to the extent that the terms "including", "includes", "having", "has", "with", or variants thereof are used in either the detailed description or the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible.

Other implementations consistent with the present teachings will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A method for producing powdered $Fe_{16}N_2$ comprising:
   sealing a powdered material comprising iron (Fe) within a pressure vessel, the powdered material comprising iron, and a fixed amount of ammonia ($NH_3$) gas, wherein sealing the pressure vessel provides a closed environment;
   elevating the pressure of the fixed amount of $NH_3$ gas in the pressure vessel to about 120 psi to about 1500 psi;
   forming at least one type of iron nitride from the powdered material comprising iron in the closed environment; and
   collecting the at least one type of iron nitride in an inert gas environment, wherein the at least one type of iron nitrides comprises $Fe_{16}N_2$.

2. The method of claim 1, wherein sealing within a pressure vessel, the powdered material comprising iron and a fixed amount of $NH_3$ comprises:
   evacuating the pressure vessel containing the powdered material comprising iron; and adding a first fixed amount of $NH_3$ gas to the pressure vessel.

3. The method of claim 2, further comprising;
   cooling the pressure vessel to condense some or all of the first fixed amount of $NH_3$ gas; and adding a second fixed amount of $NH_3$ gas to the pressure vessel.

4. The method of claim 2 wherein the first amount of $NH_3$ gas has a pressure of about 8 to about 200 psi.

5. The method of claim 1, wherein further elevating the pressure of the fixed amount of $NH_3$ gas in the pressure vessel to about 120 psi to about 1500 psi comprises heating the pressure vessel to a temperature of about 130° C. to about 200° C.

6. The method of claim 5, further comprising heating the pressure vessel for a time of about 8 hours to about 200 hours.

7. The method of claim 1, wherein a molar ratio of Fe to $NH_3$ in the pressure vessel is from about 1:4 to about 1:2000.

8. The method of claim 1, wherein the powdered material comprising iron has a form comprising spheres, spheroids, rods, wires, cubes, or sheets.

9. The method of claim 1, wherein the powdered material comprising iron has at least one dimension of about 5 nm to about 100 microns.

10. The method of claim 1, wherein the powdered material comprising iron has a ratio between a largest dimension and a smallest dimension of about 200:1 to about 1:1.

11. The method of claim 1, wherein the at least one type of iron nitride comprises 56% or more of $Fe_{16}N_2$.

12. The method of claim 1 further comprising, reclaiming any remaining of the amount of $NH_3$ in the pressure vessel after formation of $Fe_{16}N_2$.

13. The method of claim 12, wherein reclaiming any remaining of the amount of $NH_3$ comprises condensing the remaining amount of $NH_3$ in the pressure vessel.

14. The method of claim 1, where the powdered material comprising iron includes a metal oxide coating.

15. The method of claim 1, where the powdered material comprising iron includes a dopant.

* * * * *